United States Patent

Martin et al.

(10) Patent No.: US 9,624,608 B2
(45) Date of Patent: Apr. 18, 2017

(54) ARCHITECTURALLY REINFORCED DENIM

(71) Applicants: John F. Martin, Beaverton, OR (US);
LaShurya M. Wise, Portland, OR (US)

(72) Inventors: John F. Martin, Beaverton, OR (US);
LaShurya M. Wise, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 791 days.

(21) Appl. No.: 13/767,505

(22) Filed: Feb. 14, 2013

(65) Prior Publication Data
US 2013/0217288 A1 Aug. 22, 2013

Related U.S. Application Data

(60) Provisional application No. 61/600,286, filed on Feb. 17, 2012.

(51) Int. Cl.
| | |
|---|---|
| *D03D 13/00* | (2006.01) |
| *D03D 15/00* | (2006.01) |
| *B32B 5/06* | (2006.01) |
| *D03D 15/08* | (2006.01) |
| *D03D 1/00* | (2006.01) |
| *A41D 31/00* | (2006.01) |

(52) U.S. Cl.
CPC .......... *D03D 13/004* (2013.01); *B32B 5/06* (2013.01); *D03D 13/00* (2013.01); *D03D 15/08* (2013.01); *A41D 31/0055* (2013.01); *D03D 1/0035* (2013.01); *D10B 2201/02* (2013.01); *D10B 2331/021* (2013.01); *D10B 2401/02* (2013.01); *D10B 2401/063* (2013.01); *D10B 2501/04* (2013.01); *Y10T 442/3179* (2015.04)

(58) Field of Classification Search
CPC .. D03D 1/0041; D03D 15/00; A41D 31/0011; D02G 3/02; D02G 3/04; D02G 3/047; D02G 3/442
See application file for complete search history.

(56) References Cited

U.S. PATENT DOCUMENTS

| | | | |
|---|---|---|---|
| 5,077,126 A * | 12/1991 | Green | D02G 3/442 428/373 |
| 5,837,623 A | 11/1998 | Howland | |
| 5,918,319 A * | 7/1999 | Baxter | A41D 1/067 2/22 |

(Continued)

FOREIGN PATENT DOCUMENTS

| | | |
|---|---|---|
| CN | 102227524 A | 6/2008 |
| CN | 201074263 Y | 6/2008 |

(Continued)

OTHER PUBLICATIONS

International Search Report and Written Opinion of May 20, 2013 for PCT/US13/26700.

(Continued)

*Primary Examiner* — Jenna Johnson
(74) *Attorney, Agent, or Firm* — Shook, Hardy & Bacon L.L.P.

(57) ABSTRACT

A denim fabric with high tenacity and/or moisture management and/or stretch materials is provided. Proportions of materials in the denim fabric may vary during the weave of the fabric to create different performance zones in the resulting garment with or without assembling different fabric pieces.

16 Claims, 5 Drawing Sheets

(56) References Cited

U.S. PATENT DOCUMENTS

| | | |
|---|---|---|
| 6,666,235 B2 | 12/2003 | Chi |
| 6,668,868 B2 | 12/2003 | Howland |
| 7,062,789 B1 * | 6/2006 | Blackwell ................ A41D 1/08 2/79 |
| 7,156,883 B2 | 1/2007 | Lovasic |
| 7,214,425 B2 | 5/2007 | Kolmes |
| 7,820,565 B2 | 10/2010 | Van Heerden |
| 2002/0106956 A1 | 8/2002 | Howland |
| 2002/0111099 A1 | 8/2002 | Howland |
| 2003/0066571 A1 | 4/2003 | Ono |
| 2005/0081939 A1 | 4/2005 | Heiman |
| 2005/0208855 A1 | 9/2005 | Zhu |
| 2005/0255776 A1 | 11/2005 | Howland |
| 2007/0136930 A1 | 6/2007 | Dipietro |
| 2007/0243783 A1 | 10/2007 | Kotani |
| 2007/0249250 A1 | 10/2007 | Servajean |
| 2008/0229484 A1 | 9/2008 | Baychar |
| 2010/0075557 A1 * | 3/2010 | Shteiyer ............... D03D 1/0041 442/203 |
| 2010/0325766 A1 * | 12/2010 | Mackintosh ........... A41D 13/00 2/22 |
| 2011/0000020 A1 | 1/2011 | Walvius |
| 2011/0070412 A1 * | 3/2011 | Ly ............................. B32B 5/10 428/196 |
| 2011/0300366 A1 | 12/2011 | Henssen |

FOREIGN PATENT DOCUMENTS

| | | |
|---|---|---|
| CN | 201459336 U | 5/2010 |
| DE | 102005045151 A1 | 3/2007 |
| JP | 201037683 A | 2/2010 |
| WO | 2010079989 A2 | 7/2010 |
| WO | 2011034683 A1 | 3/2011 |
| WO | 2011137213 A2 | 11/2011 |
| WO | WO 2012016124 A2 * | 2/2012 ............. D03D 15/00 |

OTHER PUBLICATIONS

European Supplementary Search Report dated Jul. 7, 2015 in Application No. 13749348.2, 6 pages.

* cited by examiner

ARCHITECTURALLY REINFORCED DENIM

CROSS-REFERENCE TO RELATED APPLICATIONS

This application claims the benefit of U.S. Provisional Application No. 61/600,286, filed Feb. 17, 2012, entitled "Architecturally Reinforced Denim," which is incorporated in its entirety by reference herein.

STATEMENT REGARDING FEDERALLY SPONSORED RESEARCH OR DEVELOPMENT

Not applicable.

TECHNICAL FIELD

The present invention relates to architecturally reinforced denim fabrics. In particular, the present invention relates to architecturally reinforced denim fabrics for the use in manufacturing athletic gear for athlete of extreme sports, having moisture regulation properties and high structural integrity, even after repeated exposure to external environmental elements such as friction against cement, rock, metal, or dirt, particularly when the athlete is engaged in the particular sport.

BACKGROUND OF THE INVENTION

Athletes who practice extreme sports such as FMX, BMX, adventure racing, skateboarding, sandboarding, and many others, require specialized gear that must be comfortable and protective, but these athletes also prefer clothing and other gear that are fashionable and attractive. The specialized gear needs to be able to withstand the great physical exertion of the athlete and the exposure to different external elements that result from the environment of the particular sport.

For decades now, denim has been a popular "American comfort" staple in everyone's closet, both in the United States and around the world. While denim is a relatively tough and durable fabric, conventional denim lacks the resilience and other performance and/or comfort characteristics desired for athletic endeavors particularly extreme sports. It is an object of this invention to provide a denim fabric and gear made from this fabric suitable for extreme sports athletes, providing them with comfort and an outstanding level of protection, while being fashionable and attractive.

SUMMARY OF THE INVENTION

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present invention relates to an architecturally reinforced denim fabric and articles of manufacture made from this architecturally reinforced denim fabric. One example of the architecturally reinforced denim fabric of the present invention may be light weight and may possess moisture management properties facilitating the wicking of moisture from the wearer's skin. Denim in accordance with the present invention may provide elasticity that adds comfort and flexibility.

Denim fabric in accordance with the present invention may incorporate commercially available strengthening polymer fibers that are abrasion, temperature and/or chemical resistant. Examples of such fibers are available under such trade names as Kevlar (available from DuPont), Vectran® (available from Kuraray Co., Ltd.), Dyneema® (available from DSM Dyneema), Gold Flex® (available from Honeywell), Twanron® (available from AKZO), Nomex® (available from DuPont), and any other polymer fiber with similar physicochemical properties. These strengthening polymer fibers, when combined with cotton fibers, may yield lightweight durable denim fabrics with puncture and tear resistance while still maintaining comfort.

Yet in another example of the present invention, the architecturally reinforced denim fabric of the present invention may incorporate both moisture wicking fibers and strengthening polymer fibers in combination with cotton fibers. This denim fabric with moisture management properties and strengthening fibers may provide comfort when in contact with the skin of the wearer while still providing protection for the wearer.

The denim fabric of the present invention may be used to manufacture bottoms such as pants, shorts, skorts, skirts, tops such as jackets, shirts, etc. Other items of apparel such as hats, gloves, etc., may be manufactured in accordance with the present invention. The denim fabric of the present invention may also be used in the fabrication of shoes or shoe parts, such as shoe uppers.

The denim of the present invention may be different tones of the typical indigo blue, or may also be different tones of other colors such as black, red, orange, yellow, pink, purple, green, or any other color available for the dyeing of cotton based fabrics, or any combination of colors and tones of the dyes.

Any style of pants may be constructed in accordance with the present invention. Examples of pants for male athletes of extreme sports of the present invention may be skinny, slim, straight, baggy, taper, boot cut, or classic fits such as relaxed or comfort fit jeans, or jeans with any other custom fit chosen to be appropriate for the particular sport. Examples of pants for female athletes of extreme sports of the present invention may be leggings, slim, skinny, boot cut, flare, baggy, wide leg fit jeans, or jeans with any other custom fit chosen to be appropriate for the particular sport. The pants manufactured from the denim fabric of the present invention may incorporate padding in areas of high impact, such as the buttocks and the knees, to offer impact absorption in case of a fall.

In a further example, pants may be manufactured utilizing a combination components made of classic 100% cotton denim and components made of one or more denim fabrics in accordance with the present invention. In another example, pants may be manufactured from a combination of different denim fabrics of the present invention, such as moisture management denim and strengthened denim, or moisture management denim and strengthened denim with added moisture management capabilities, etc. Different types of denim may be combined to create a single garment in accordance with the present invention by stitching or otherwise joining together different types of fabric to form a garment and/or by controlling and varying textile properties while weaving the fabric to be used in forming a garment.

The same ideas as for the fabrication of pants presented above, could also be applied to the fabrication of tops such as jackets, shirts, vests, gloves, hats, shoes or any other type of garment suitable to be worn during the practice of extreme sports, or during the practice of a highly physically demanding activities.

Additional objects, advantages, and novel features of the invention will be set forth in part in the description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

Classic denim fabrics are made of 100% cotton fibers which provide advantageous properties such as good absorbency, comfortable soft hand and good color retention. However, 100% cotton denim fabrics are limited to the properties of cotton fibers which may not be stretchable, tend to retain water (making such fabrics slow to dry), shrink easily, retain soil, and tend to wear out faster than synthetic fibers. Therefore, an object of the present invention is to provide a cotton and synthetic fiber blend denim fabric that takes advantage of all the good traits of cotton fibers and at the same time, takes care of the disadvantages of cotton fibers by blending synthetic fibers.

Figure 1:
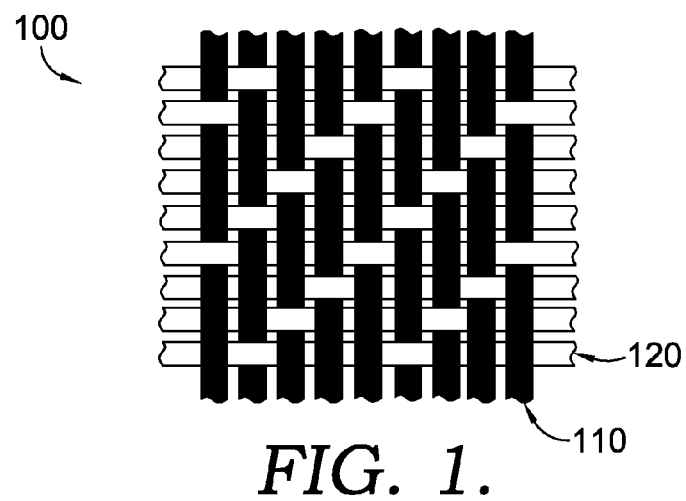
FIG. 1 is an enlargened view of a twill weave, typical of denim fabrics.

Twill is a type of textile weave with the characteristic diagonal pattern observed in denim fabrics. Classic denim is a two faced "twill" construction fabric, as is illustrated in the piece of fabric 100 presented in FIG. 1. In classic denim, the front is considered to be the warp-face consisting mainly of the warp yarn 110 (usually tinted indigo blue to give "blue jeans" their distinctive color), and the back-face comprised mostly of the fill yarn 120 (usually left white). In the present description "yarn" is to be understood to be an assembly of fibers spun or twisted together to form a long and continuous string or filament useful for weaving or knitting fabric materials. The words "environment" and "environmental" are to be understood as the particular surfaces where athletes of extreme sports perform their activities, for example a skatepark for skateboarders usually comprising a series of ramps and half pipes made of wood, cement, or synthetic construction materials. For FMX and BMX riders, the "environment" may comprise mountainous terrain, etc. Other types of extreme sports, and even day to day wear, may involve different environments.

Figure 2:
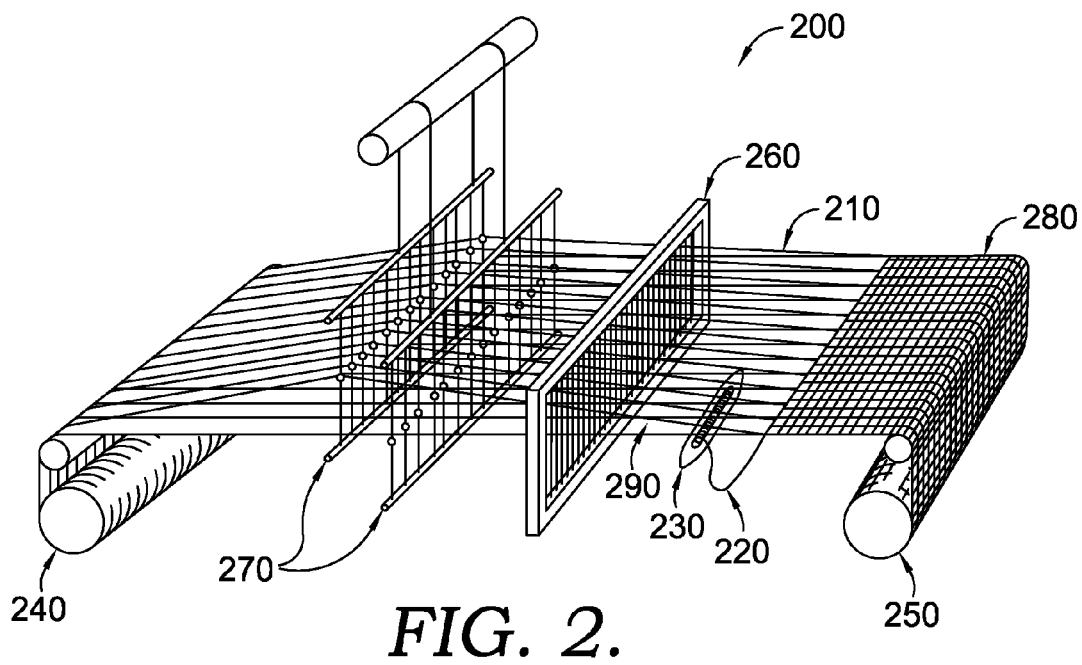
FIG. 2 is an illustration of an exemplary loom where the warp yarns and the fill yarns used in the weaving of fabrics can be identified.

In FIG. 2, an exemplary loom 200 is depicted. In a weaving process, warp yarns 210 are fed to the loom 200 from a warp beam 240 and finally rolled as the finished woven fabric 280 onto a fabric beam 250. The warp yarns 210 are kept tightened throughout the weaving process. A loom 200 typically has at least two "harnesses" 270 holding different sets of warp yarns 210. When one of the harnesses is lifted, a set of warp yarns is lifted and a v-shaped "shed" 290 is created in between the two sets of warp yarns 210. The fill yarn(s) 220 is then completely passed through the shed 290 via a shuttle 230 and then, the lifted harness is lowered. A comb like "reed" 260 is used to push the fill yarn(s) 220 tightly into place. Finally, when a different set of warp yarns 210 is lifted with a different harness, the fill yarn(s) 220 becomes trapped and interlaced forming the woven fabric 280.

It should be noted that there are different kinds of looms that may operate differently, especially modern day industrial looms. Modern day industrial looms, are automated and may or may not have shuttles carrying the fill yarn(s). Examples of modern day industrial looms are Water Jet looms, Air Jet looms, Shuttle looms, Rapier looms and Projectile looms. Water Jet and Air Jet looms are typically very fast because they do not require a shuttle to carry the fill yarn(s) across the warp yarns. Typically, when using Water Jet and Air Jet looms, the selvage on the fabric produced (the edges on either side of the fabric) is fringed because the fill yarn(s) is trimmed after insertion. Shuttle, Rapier and Projectile looms may be slower than Water Jet and Air Jet looms due to their higher requirement for mechanical action. However, fabrics produced with Shuttle, Rapier and Projectile looms have a finished selvage because they are produced from a continuous strand of fill yarn(s).

A first example denim fabric, hereinafter "moisture wicking denim" may possess moisture management capabilities by incorporating moisture wicking polymer fibers such as but not limited to Sorbtek® (available from Unifi). For example, Sorbtek® polyester fibers or any other polymer fibers with like properties may be incorporated in core spun yarns to be used as fill yarns. With the addition of moisture management polymer fibers in the moisture wicking denim in accordance with the present invention, when an athlete perspires, the moisture wicking denim fabric is able to pull the moisture produced on the surface of the athlete's skin away from the athlete's skin and subsequently facilitate evaporation of the moisture. By pulling away moisture from the athlete's skin without retaining the moisture, the athlete may experience a continuous dry feeling, increasing the levels of comfort for the athlete.

When constructing the moisture wicking denim in accordance with the present invention, the warp yarns may comprise up to 100 weight percent cotton and carry the color for the final constructed denim fabric. The fill and/or warp yarns for the construction of the moisture wicking denim fabric of the present invention may also comprise additional synthetic fibers in the form of spandex or elastane, or any other elastic fiber usable in the construction of fabrics to add elasticity to the final moisture wicking denim fabric.

The moisture wicking denim fabric of the present invention may comprise up to 63 weight percent cotton fiber. For example, the moisture wicking denim fabric may comprise 40 to 63, 45 to 60, or 50 to 55 weight percent cotton fiber.

Further, the moisture wicking denim fabric of the present invention may comprise at least 35 weight percent moisture management polymer fibers and at least 2 weight percent elastic fibers.

A second example denim fabric, hereinafter "architecturally reinforced denim" may use high tenacity yarns integrated into the denim fabric for durability and strength. The high tenacity yarns of the present invention may incorporate synthetic liquid crystal polymer materials such as Vectran®, Kevlar®, Nomex®, Dyneema®, Twaron®, or the like, or any combination of different synthetic liquid crystal polymer materials suitable for the construction of fabrics. These synthetic liquid crystal polymer materials are desirable because they exhibit extraordinary physicochemical properties due to their unique crystalline like ordered state when melted or dissolved in a solvent. Processing these liquid crystal polymers into fibers or extrusion molded materials, gives rise to polymeric fibers or materials that have high resistance to chemical damage, wear and tear, puncturing, rupturing, and have great mechanical strength. The outstanding resilience properties of these synthetic polymer materials are a result of their self reinforcing properties at the molecular level deriving from the specific molecular organization and orientation of the molecules known as Van der Waals interactions. Another advantage of these types of synthetic polymer materials is their light weight and soft feel.

The fibers of the high tenacity polymer material for the manufacture of the architecturally reinforced denim of the present invention may be spun and incorporated directly into the cotton warp and/or the fill yarns. The fill yarns may also incorporate moisture management polymer fibers to add moisture management capabilities, as in the moisture wicking denim example presented earlier. Further, the high tenacity polymer material may be incorporated in the warp yarns, as the warp yarns go to the front face (exposed surface), which is the face directly subjected to the most environmental stress. Alternatively, the fibers of the high tenacity polymer materials may be spun into a 100 weight percent high tenacity polymer yarn. The 100 weight percent high tenacity polymer yarns may then be intercalated with up to 100 weight percent cotton yarns either as the warp and/or the fill yarns.

The architecturally reinforced denim example of the present invention may comprise up to 63 weight percent cotton fiber. The architecturally reinforced denim fabric may comprise 40 to 63, 45 to 60, or 50 to 55 weight percent cotton fiber. The architecturally reinforced denim fabric example of the present invention may comprise at least 35 weight percent synthetic and high tenacity synthetic polymer fibers and at least 2 weight percent elastic fibers, to increase elasticity and comfort, and improve fit when fabric is made into a garment.

The architecturally reinforced denim example of the present invention, in addition to its sturdiness, may also have an added visual and textural effect by having "wire" like motifs that correspond to the high tenacity yarns in the garment. The high tenacity yarns may optionally protrude from the front face of the denim weave, have different color, or otherwise be visually distinct from the other portions of a garment. However, such visual aspects of the high tenacity yarns are not necessary in garments in accordance with the present invention. For example, the motifs may be incorporated in the architecturally reinforced denim example by using the high tenacity synthetic polymer fibers in the warp and/or fill yarns taking advantage of the different look and feel that these fibers may have when compared to cotton fibers. Further, the motifs may be presented diagonally in the same direction of the twill weave, the motifs may be continuously sequential, or the motifs may be spaced apart (spacing may be chosen according to the final desired visual and textural effect). In another example, the motifs may be woven into different shapes such as zig zag lines, curly lines, squares, circles, etc. Further, the motifs may be woven into particular designs or logos.

A third example denim fabric in accordance with the present invention, hereinafter "architecturally reinforced wicking denim" is further provided wherein properties of the moisture wicking denim through the moisture management fibers and the high tenacity polymer fibers are combined to provide a smooth, light weight, comfortable, dry feeling, resilient denim. The architecturally reinforced wicking denim example of the present invention provides outstanding resilience and protection against rips, and significantly slows down wear and tear even when exposed against repeated friction against harsh surfaces such as cement, rocks, sand, etc.

The architecturally reinforced wicking denim example of the present invention may comprise up to 63 weight percent cotton fiber. For example, the architecturally reinforced wicking denim example may comprise 40 to 63, 45 to 60, or 50 to 55 weight percent cotton fiber. The architecturally reinforced wicking denim fabric example of the present invention may comprise at least 35 weight percent of a combination of synthetic and high tenacity polymer synthetic fibers and moisture management fibers, and at least 2 weight percent elastic fibers, to increase comfort and improve fit when fabric is made into a garment.

The architecturally reinforced wicking denim of the present invention may further comprise other polymeric treatments such as "waterless wash," or other finishing technologies suitable for the particular end use of the garment made from the denim of the present invention.

As briefly presented earlier, denim in accordance with the present invention may be used to manufacture different types of garments including tops (e.g. vests, jackets, shirts, blouses, etc), bottoms (e.g. pants, skirts, shorts, skorts, etc), gloves, pads, shoes, hats, etc. The garments may be made completely of one denim type in accordance with the present invention, or a combination of multiple denim types in accordance with the present invention. The garments may also be made from a combination of classic 100 weight percent cotton denim with one, or more types of denim in accordance with the present invention. The denim of the present invention when used in combination with other types of denim may be placed in strategic areas of the garments to maximize the specific characteristics of each type of denim.

For example, in the manufacture of pants for athletes of skateboarding, sandboarding, and/or competitive extreme rollerblading, the pants may be constructed completely of architecturally reinforced wicking denim to provide all best characteristics of moisture management and strength. Additionally, the pants may discretely comprise padding in the areas of the buttocks and the knees to provide shock absorption in case of a fall.

In another example of athletic denim pants, the area of the waist line may be comprised of the moisture wicking denim example where the pants come in closest contact with the body. The areas of the buttocks and the knees may comprise the architecturally reinforced denim example to provide visual appeal and added strength and resilience to these areas, which are subjected to greater stress both from the movement of the athlete and from contact with environmental stressors. The rest of the pants may comprise classic stretchable, and/or classic non-stretchable lightweight denim, and/or architecturally reinforced wicking denim, and/or any other type of denim or even other fabrics. These different denim types in different performance zones of the garment may, for example, be welded and/or stitched together to construct the final garment.

In a different example, multiple types of denim may be woven at different locations on a textile that will be formed into a garment to create different performance zones. For example, the moisture wicking denim and the architecturally reinforced denim examples may be woven into different performance zones of the same fabric piece. Yet, in another example, the moisture wicking denim and the architecturally reinforced wicking denim examples may be woven into different performance zones of a single fabric piece. Further, the architecturally reinforced wicking denim and the architecturally reinforced denim examples may be woven into different performance zones of a single fabric piece, or yet in another example, all three denim types, i.e. the moisture wicking denim, the architecturally reinforced denim and the architecturally reinforced wicking denim may be woven into different performance zones of a single fabric piece.

In yet a further example, a full body garment for a BMX or FMX athlete may be constructed from one or a few pieces of fabric woven into different performance zones. First, the areas corresponding to the elbows, chest, crotch, buttocks and knees of an athlete may be woven into the architecturally reinforced denim in accordance with the present invention to provide extra resilience in those areas. Second, the areas corresponding to the back and thighs may be woven into the architecturally reinforced wicking denim of the present invention to provide comfort and resilience by wicking away perspiration from these areas. Finally, the areas of the armpits and the rest of the garment may be woven into the moisture management denim, where resilience is not as crucial as moisture management.

Figure 3:
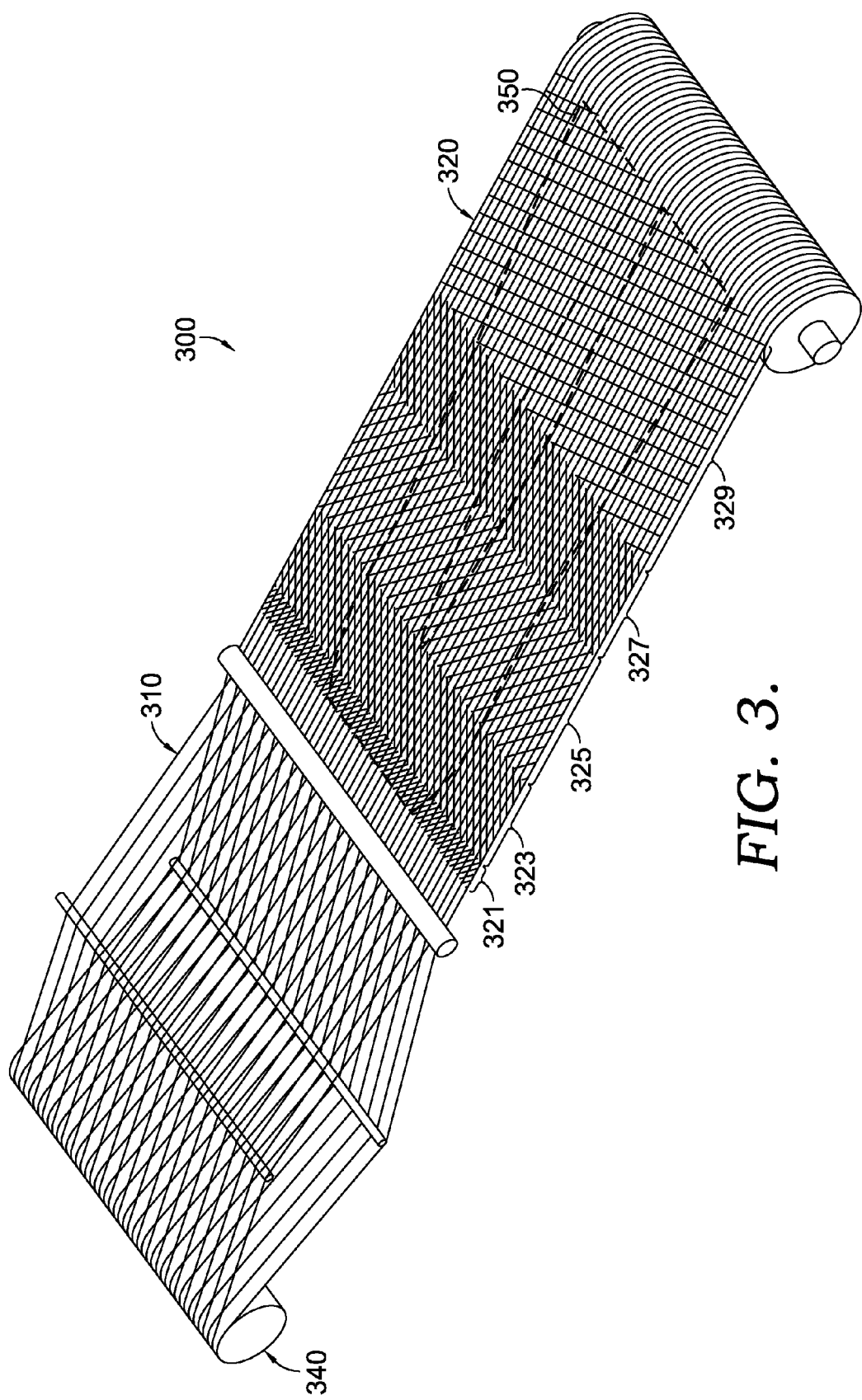
FIG. 3 is a perspective view of an exemplary denim fabric as it is being woven and rolled. Also, a schematic of a garment is shown on the fabric to show how a garment with multiple "performance zones" is constructed from a single fabric in accordance with the present invention.

Shown in FIG. 3 is a section of a loom 300 weaving a denim fabric 320 with different performance zones in accordance with the present invention. The warp yarns 310 are fed from warp beam 340 and the fill yarn(s) is fed according to the loom type (not shown). The fabric piece 320 shown in FIG. 3 has a first performance zone 321, a second performance zone 323, a third performance zone 325, a fourth performance zone 327, and finally a fifth performance zone 329 woven into it.

In the example shown in FIG. 3, a zoned denim fabric for the construction of pants 350 for an athlete of extreme sports is shown. The example illustrated by FIG. 3 is not necessarily to scale. For example, multiple garment pieces may be cut from a single width of fabric woven in accordance with the present invention. The different types of fibers needed for the different performance zones of the final fabric piece may be introduced through the warp yarns and/or the fill yarns. If the different types of fibers are introduced through warp yarns, warp yarns having different types of fibers along their length may be used. The presence of each different type of fiber along the warp yarns' lengths may be predetermined according to the specifications of the final fabric product. If the different types of fibers are introduced through the fill yarn(s), the fill yarn(s) may be spliced with the yarn containing the next type of polymer fiber desired.

In FIG. 3, only one cut is made for the construction of a garment. However, depending on the width of the zoned denim fabric, several garments could be cut out along the width of the zoned denim fabric in accordance with the present invention. The position of performance zones along the length and/or width of a textile should be accorded for in laying out and/or cutting pieces for forming garments in accordance with the present invention. For example markers denoting transitions between performance zones may be temporarily or permanently applied to the textile, woven into the textile, etc. Alternatively/additionally, different types of performance zones may be distinguishable from one another. Markers and/or performance zones themselves may be perceived by an unaided human, an aided human (for example using black light), or may be detected by automated sensors. By way of further example, computer software operating on a computing device may coordinate weaving and cutting operations to assure the proper location of performance zones in the final garment.

Continuing on the discussion of FIG. 3, a denim fabric for the fabrication of athletic pants 350 with different performance zones woven in to it is provided. Performance zone 321 may also be thought of as a waist performance zone and may be woven into a moisture wicking denim fabric by supplying the moisture management fibers through the fill yarn(s) and/or the warp yarns to provide moisture management comfort along the waistline of pants 350. Performance zone 323 may also be thought of as a buttocks performance zone and may be woven into an architecturally reinforced denim fabric to provide protection and durability in the area of the buttocks. The high tenacity fibers may be supplied mainly through the warp yarns to place the high tenacity fibers on the external face of the garment. Performance zone 325 may also be thought of as a thigh performance zone and may be woven into an architecturally reinforced wicking denim fabric with both the moisture management fibers and the high tenacity fibers incorporated. Performance zone 327 may also be thought of as a knee performance zone and may again be woven into an architecturally reinforced denim fabric like in the buttocks performance zone 323 to provide the protection and durability in the knee area. Performance zones 323 and 327, which are subjected to high levels of stress both from the environment and the physical exertion of the athlete may need extra reinforcement and thus, may comprise up to 100 weight percent high tenacity synthetic polymer fibers. Finally, performance zone 329 may also be thought of as a calf performance zone and may be woven into a classic denim fabric since performance zone 329 is subject to the least amount of stress when pants 350 are worn by the athlete. In yet a further example, a full body garment for a BMX or FMX athlete.

Figure 4:
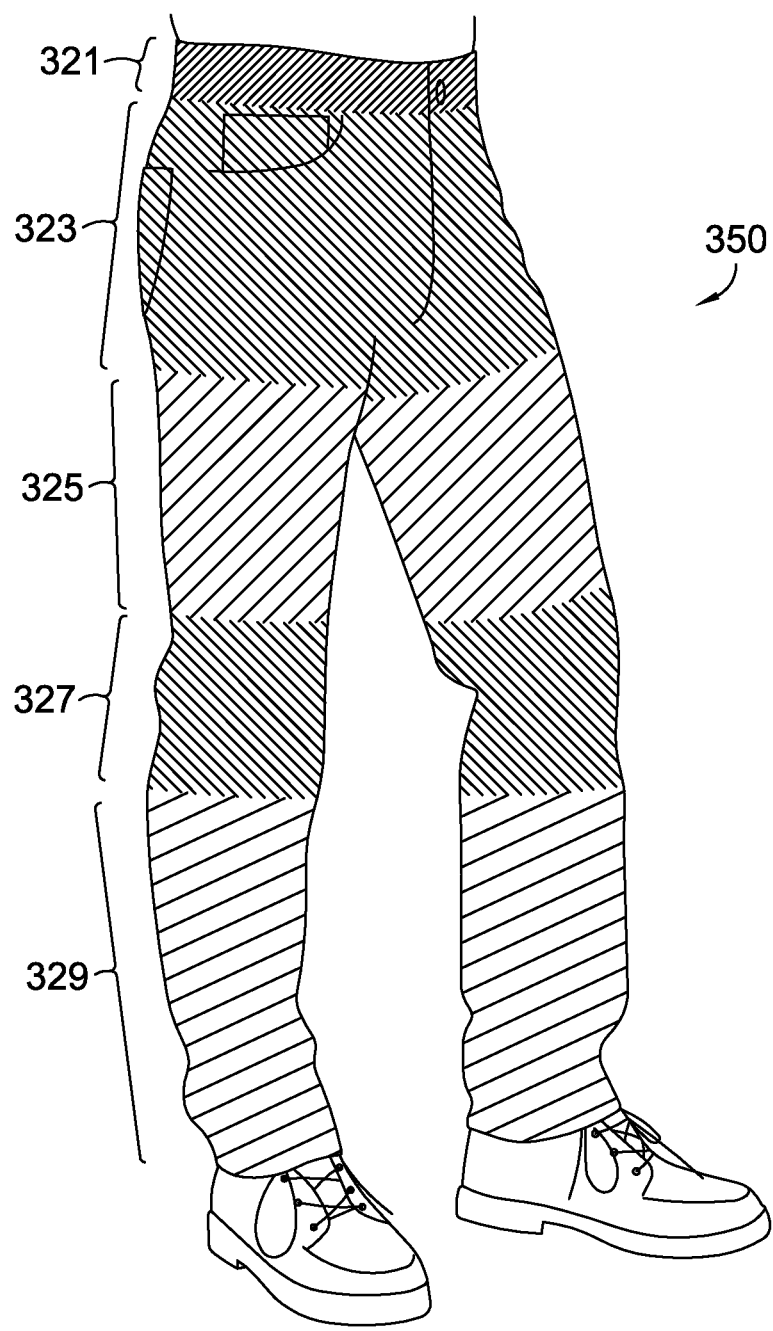
FIG. 4 is an illustration of the constructed garment with the different "performance zones" in FIG. 3 shown as worn by an athlete.

FIG. 4 is an exemplary illustration of constructed pants 350 from the zoned denim fabric presented in FIG. 3, as worn by an athlete. As can be observed in FIG. 4, the waist performance zone 321 corresponds to the waistline of the athlete, the buttocks performance zone 323 corresponds to the buttocks area of the athlete, the thigh performance zone 325 corresponds to the thighs of the athlete, the knee performance zone 327 corresponds to the knees of the athlete, and finally, the calf performance zone 329 corresponds to the calves of the athlete and extents downward towards the ankles of the athlete.

Figure 5A:
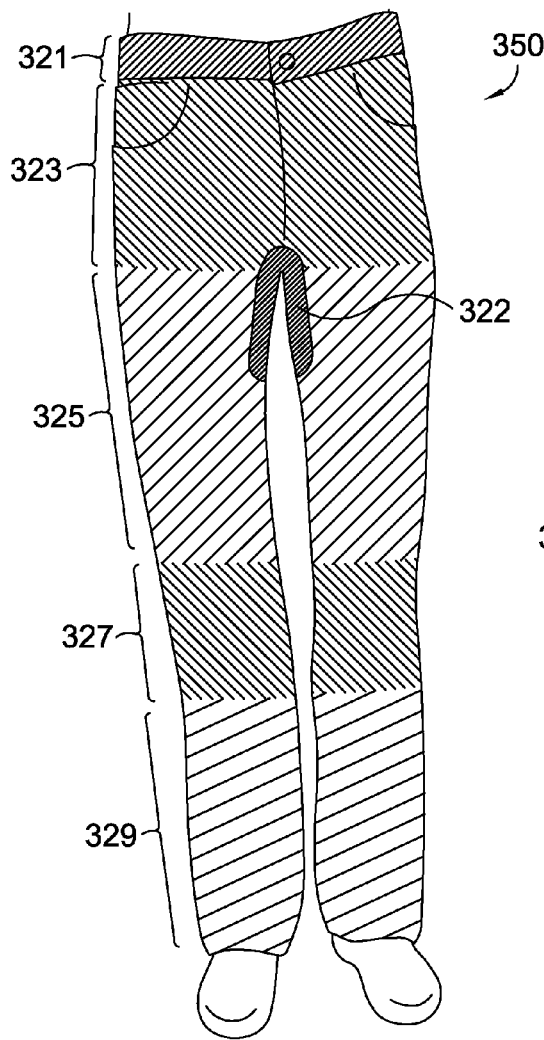
FIG. 5A is a front view of the constructed garment with the different "performance zones" in FIG. 4 further comprising a gusset performance zone, shown as worn by an athlete.
Figure 5B:
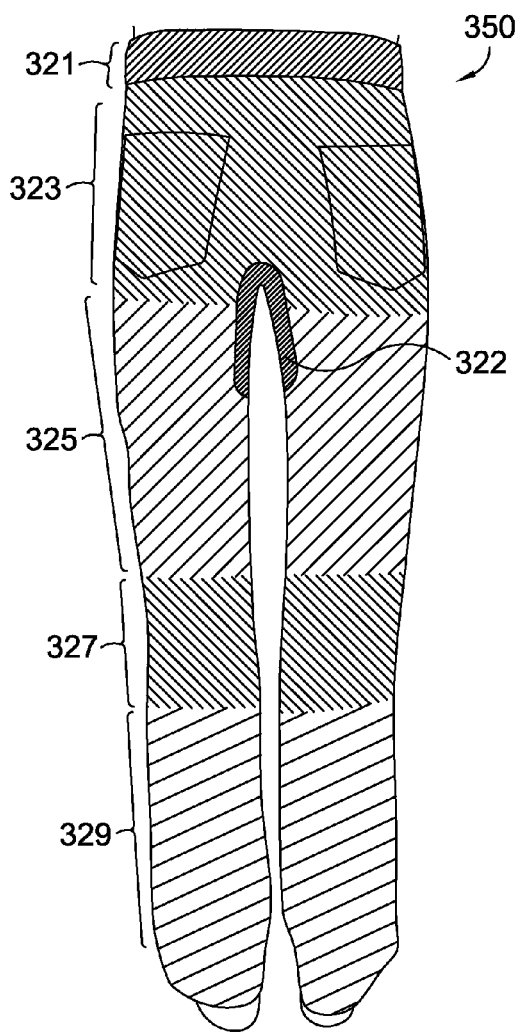
FIG. 5B is a back view of the constructed garment with the different "performance zones" in FIG. 5A.
Figure 5C:
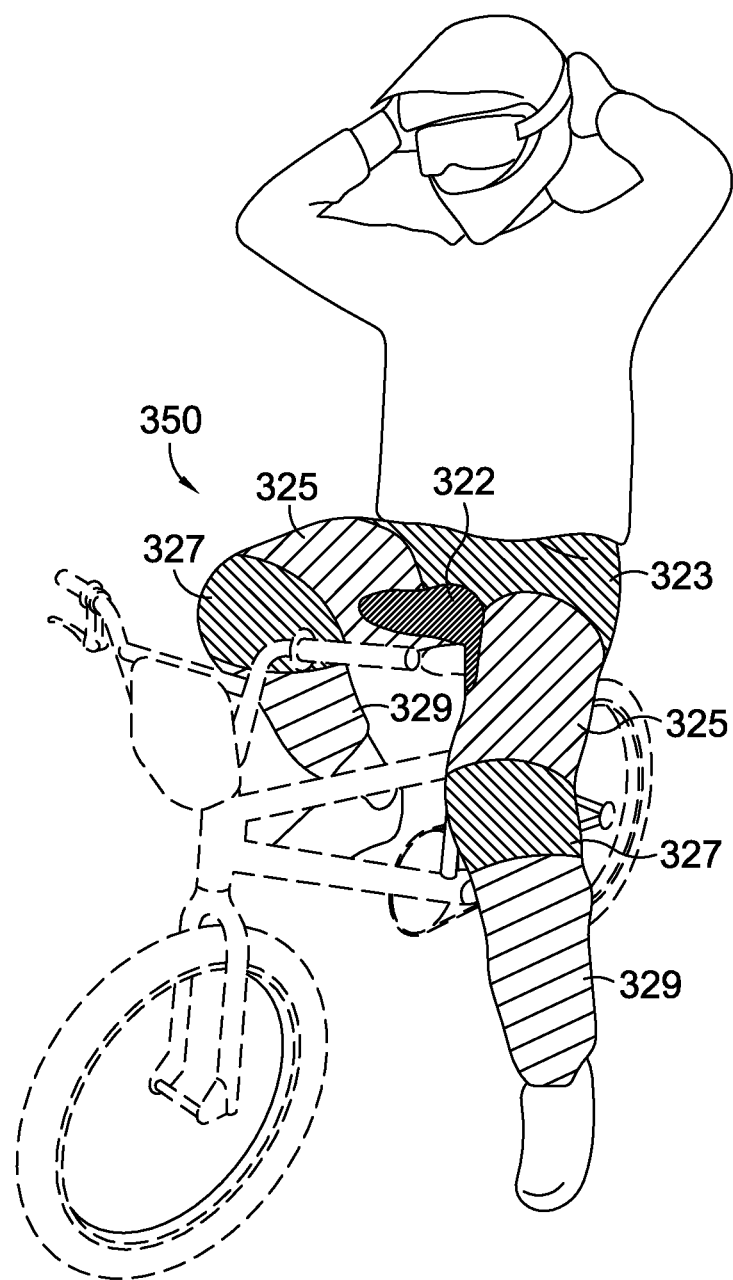
FIG. 5C is a perspective view of the constructed garment in FIG. 5A and FIG. 5B, showing the garment as worn by an athlete of BMX.

FIG. 5A through FIG. 5C show a further example of constructed pants 350 from the zoned denim fabric presented in FIG. 3, as worn by an athlete such as a BMX athlete. Pants 350 in FIG. 5A through FIG. 5C are constructed with the same performance zones as the pants 350 presented in FIG. 4 except, in FIG. 5A through FIG. 5C, the pants 350 further comprise an extra tough and resilient gusset performance zone 322 corresponding to the crotch area when pants are worn. The gusset performance zone 322 in pants 350 may be subject to constant friction from the contact with the seat of a bike, and thus the need for extra protection in this area may be necessary for better protection of the athlete and durability of pants 350.

FIG. 5A is a front view of pants 350 as worn by an athlete. As can be observed in FIG. 5A, the waist performance zone 321 corresponds to the waistline of the athlete, the buttocks performance zone 323 corresponds to the hip area of the athlete on the front, the thigh performance zone 325 corresponds to the thighs of the athlete, the gusset performance zone 322 corresponds to the crotch area of the athlete, the knee performance zone 327 corresponds to the knees of the athlete, and finally, the calf performance zone 329 corresponds to the calves of the athlete and extents downward towards the ankles of the athlete. Further, the gusset performance zone may extend partially (as shown) or completely around the leg of the athlete (not shown).

FIG. 5B is a back view of pants 350 as worn by an athlete. As can be observed in FIG. 5A, the waist performance zone 321 corresponds to the waistline of the athlete, the buttocks performance zone 323 corresponds to the buttocks area of the athlete on the back, the thigh performance zone 325 corresponds to the thighs of the athlete, the gusset performance zone 322 corresponds to the crotch area of the athlete, the knee performance zone 327 corresponds to the knees of the athlete, and finally, the calf performance zone 329 corresponds to the calves of the athlete and extents downward towards the ankles of the athlete. Further, the gusset performance zone may extend partially (as shown) or completely around the leg of the athlete (not shown).

FIG. 5C is a perspective view of a BMX athlete sitting on a bike and wearing pants 350. FIG. 5C shows with more clarity how the different performance zones may play an important role in protecting the athlete and, at the same time, insuring the comfort of the athlete when the pants 350 are worn.

Since the different performance zones in a zoned denim fabric in accordance with the present invention are very specific and must be localized properly in the final garment, extra care may be taken when cutting out the fabric and then constructing the desired garment. Alternatively, the denim fabric may have a fixed width corresponding exactly to the length of the garment. Then, the different performance zones may be woven vertically along the fabric's length such that the cuts for the garments may be taken horizontally. In other words, the zoning set up shown in FIG. 3 may be rotated 90 degrees such that the different zones appear from left to right, or right to left, as opposed to from top to bottom (as shown). In addition to being visually appealing, apparel made from a single fabric with different performance zones may be more comfortable since the need for bulky stitching between two or more fabrics when trying to create a garment with different properties in different areas would be eliminated. Reducing the amount of stitching needed to create a garment with different properties in different areas also makes a more durable garment since the chances of the garment coming apart if the stitches become undone may be reduced.

Single fabric pieces comprising two or more denim types woven together, may be custom woven to manufacture custom made garments or protective gear that fit the specific needs of the user, and specific to the particular sport or activity to be engaged in. Also, whether the zoning setup is done along the fabrics length or across the fabric's length, different permutations of the zones may be possible. The specific zone lengths and frequencies may be adjusted according to the needs for the specific garments to be constructed.

Further, the garments or protective gear comprising the denim of the present invention may be woven using dual-loom technology to create seamless garments and protective gear. For example, in the manufacture of gloves, the palm-side may be woven into an architecturally reinforced wicking denim fabric and the back side may be woven into an architecturally reinforced denim fabric. This combination would result in a strong, flexible and moisture absorbent glove on the palm-side (where sweat gathers) and a strong, flexible and protective glove on the back side. This dual-loom weaving could also be applied to other garments such as pants, shorts, vests, shoes, socks, etc., choosing the right type of denim for different areas of choice. This may be done with any combinations and permutations of architecturally reinforced wicking denim, architecturally reinforced denim, moisture wicking denim, classic stretchy, and/or classic non-stretchy denim. Further, the names, compositions and/or properties of these three examples of denim in accordance with the present invention are for illustrative purposes only.

As one may also be able to conceive, the possibilities presented above may be applied to other types of fabrics as well, not being limited to denim.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Having thus described the invention, what is claimed is:

1. An architecturally reinforced denim woven fabric comprising:
 a first face and an opposite second face, wherein the first face is different from the opposite second face;
 at least a first woven performance zone comprising a first ratio of synthetic fiber to natural fiber, wherein the first woven performance zone is positioned at a first location on the architecturally reinforced denim woven fabric, wherein the first woven performance zone comprises:
  (1) up to a 63 weight percent cotton fiber;
  (2) at least a 35 weight percent combination of moisture management polymer fiber and high tenacity polymer fiber, wherein the high tenacity polymer fiber is in one or more warp yarns, and wherein the moisture management polymer fiber is in one or more fill yarns of the architecturally reinforced denim woven fabric and wherein the one or more warp yarns are exposed on the second face and the one or more fill yarns are exposed on the first face; and
  (3) at least a 2 weight percent elastic polymer fiber; and
 at least a second woven performance zone comprising a second ratio of synthetic fiber to natural fiber, wherein the first ratio of synthetic fiber to natural fiber is different than the second ratio of synthetic fiber to natural fiber, and wherein the second woven performance zone is positioned at a second location on the architecturally reinforced denim woven fabric such that it is integrally woven and seamlessly adjacent to the first woven performance zone.

2. The architecturally reinforced denim woven fabric of claim 1, wherein the second woven performance zone comprises:
 up to a 63 weight percent of the cotton fiber;
 at least a 35 weight percent of the high tenacity polymer fiber; and
 at least a 2 weight percent of the elastic polymer fiber.

3. The architecturally reinforced denim woven fabric of claim 2, wherein the architecturally reinforced denim woven fabric further comprises a third woven performance zone, the third woven performance zone comprising a 100 weight percent cotton fiber.

4. The architecturally reinforced denim woven fabric of claim 1, wherein the first face of the architecturally reinforced denim woven fabric is configured to be an internal face of a manufactured garment and the opposite second face of the architecturally reinforced denim woven fabric is configured to be an external face of the manufactured garment.

5. The architecturally reinforced denim woven fabric of claim 4, wherein the warp yarns are visually distinct from other portions of the architecturally reinforced denim woven fabric.

6. An architecturally reinforced denim woven fabric comprising:
- at least a first woven performance zone comprising a first ratio of synthetic fiber to natural fiber, wherein the first woven performance zone is positioned at a first location on the architecturally reinforced denim woven fabric, wherein the first woven performance zone comprises:
  (1) up to a 63 weight percent cotton fiber;
  (2) at least a 35 weight percent high tenacity polymer fiber, wherein the high tenacity polymer fiber is incorporated into one or more warp yarns of the architecturally reinforced denim woven fabric; and
  (3) at least a 2 weight percent elastic polymer fiber; and
- at least a different second woven performance zone comprising a second ratio of synthetic fiber to natural fiber, wherein the first ratio of synthetic fiber to natural fiber is different from the second ratio of synthetic fiber to natural fiber, and wherein the second woven performance zone is positioned at a second location on the architecturally reinforced denim woven fabric, wherein the first location is different from the second location, and wherein the first woven performance zone and the second woven performance zone are integrally woven and are seamlessly adjacent to each other.

7. The architecturally reinforced denim woven fabric of claim 6, wherein the first woven performance zone comprises between 45 and 60 weight percent cotton fiber.

8. The architecturally reinforced denim woven fabric of claim 6, wherein the high tenacity polymer fiber comprises liquid crystal polymer materials.

9. The architecturally reinforced denim woven fabric of claim 6, wherein the second woven performance zone comprises a 100 weight percent cotton fiber.

10. The architecturally reinforced denim woven fabric of claim 6, wherein the warp yarns comprising the high tenacity polymer fiber form one or more protrusions on an external surface of the architecturally reinforced denim woven fabric that are visually distinct from other portions of the architecturally reinforced denim woven fabric.

11. A garment manufactured from an architecturally reinforced denim woven fabric, the garment comprising seamlessly adjacent and integrally woven performance zones, wherein:
- a first woven performance zone comprising a first ratio of synthetic fibers to natural fibers, wherein the synthetic fibers comprise high tenacity polymer fibers forming one or more warp yarns;
- a second woven performance zone comprising a second ratio of synthetic fibers to natural fibers that is different from the first ratio of synthetic fibers to natural fibers, wherein the synthetic fibers comprise moisture management polymer fibers and high tenacity polymer fibers, wherein the moisture management polymer fibers form one or more fill yarns and the high tenacity polymer fibers form one or more warp yarns; and
- a third woven performance zone comprising a third ratio of synthetic fibers to natural fibers that is different from the first ratio and the second ratio of synthetic fibers to natural fibers.

12. The garment of claim 11, wherein the first woven performance zone of the garment is configured to form a thigh and knee performance zone configured to align with the thighs and knees of a wearer when the garment is worn; wherein the second woven performance zone of the garment is configured to form a buttocks performance zone configured to align with the buttocks of the wearer when the garment is worn; and wherein the third woven performance zone of the garment is configured to form a calf performance zone configured to align with the calves of the wearer when the garment is worn.

13. The garment of claim 12, wherein the buttocks performance zone and the knee performance zone further comprise padding for shock absorption.

14. The garment of claim 11, wherein the first woven performance zone and the second woven performance zone comprise up to a 63 weight percent of cotton fiber, and the third woven performance zone comprises 100 weight percent of the cotton fiber.

15. The garment of claim 11, wherein the garment comprises an internal face and an external face, wherein the high tenacity polymer fiber in the first performance zone and the second performance zone is mainly located on the external face of the garment.

16. The garment of claim 15, wherein a portion of the warp yarns comprising the high tenacity polymer fiber form one or more protrusions on the external face of the garment, wherein the one or more protrusions are visually distinct from other portions of the external face of the garment.

* * * * *